United States Patent [19]

Tsuda

[11] Patent Number: 4,567,322
[45] Date of Patent: Jan. 28, 1986

[54] FACSIMILE APPARATUS

[75] Inventor: Shin Tsuda, Yokohama, Japan

[73] Assignee: Canon Kabushiki Kaisha, Tokyo, Japan

[21] Appl. No.: 572,849

[22] Filed: Jan. 23, 1984

[30] Foreign Application Priority Data

Jan. 27, 1983 [JP] Japan .................................. 58-10532

[51] Int. Cl.⁴ ........................ H04M 11/00; H04N 1/00
[52] U.S. Cl. .................................... 179/2 A; 179/2 R; 358/256; 358/304
[58] Field of Search .................... 179/2 A, 2 R, 2 DP; 358/256, 268, 285, 296, 304, 286

[56] References Cited

U.S. PATENT DOCUMENTS

| | | | |
|---|---|---|---|
| 2,506,437 | 5/1950 | Watson | 179/2 R |
| 4,502,080 | 2/1985 | Tsuda | 358/286 |

FOREIGN PATENT DOCUMENTS

| | | | |
|---|---|---|---|
| 2855971 | 7/1980 | Fed. Rep. of Germany | 179/2 R |
| 3042885 | 5/1982 | Fed. Rep. of Germany | 179/2 R |
| 2082013A | 2/1982 | United Kingdom | 358/286 |

Primary Examiner—Gene Z. Rubinson
Assistant Examiner—W. J. Brady
Attorney, Agent, or Firm—Fitzpatrick, Cella, Harper & Scinto

[57] ABSTRACT

In a facsimile apparatus, single control means functions to have a plurality of functions by detecting states of a plurality of elements mounted on the facsimile apparatus. The states of a hand-set of a telephone set, an original sheet and a record paper are detected and a single control button controls switching to a transmission mode, a reception mode, a copy mode or a record paper cut mode. The arrangement provides a small and inexpensive apparatus and improves the operability of the apparatus.

5 Claims, 8 Drawing Figures

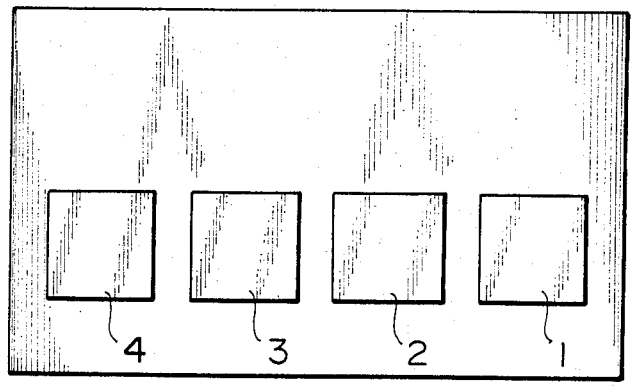
F I G. I
PRIOR ART
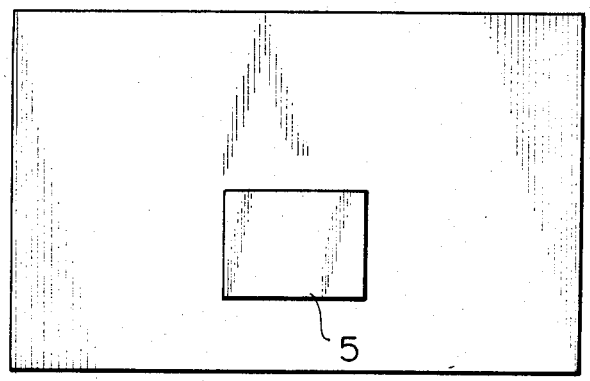
F I G. 3

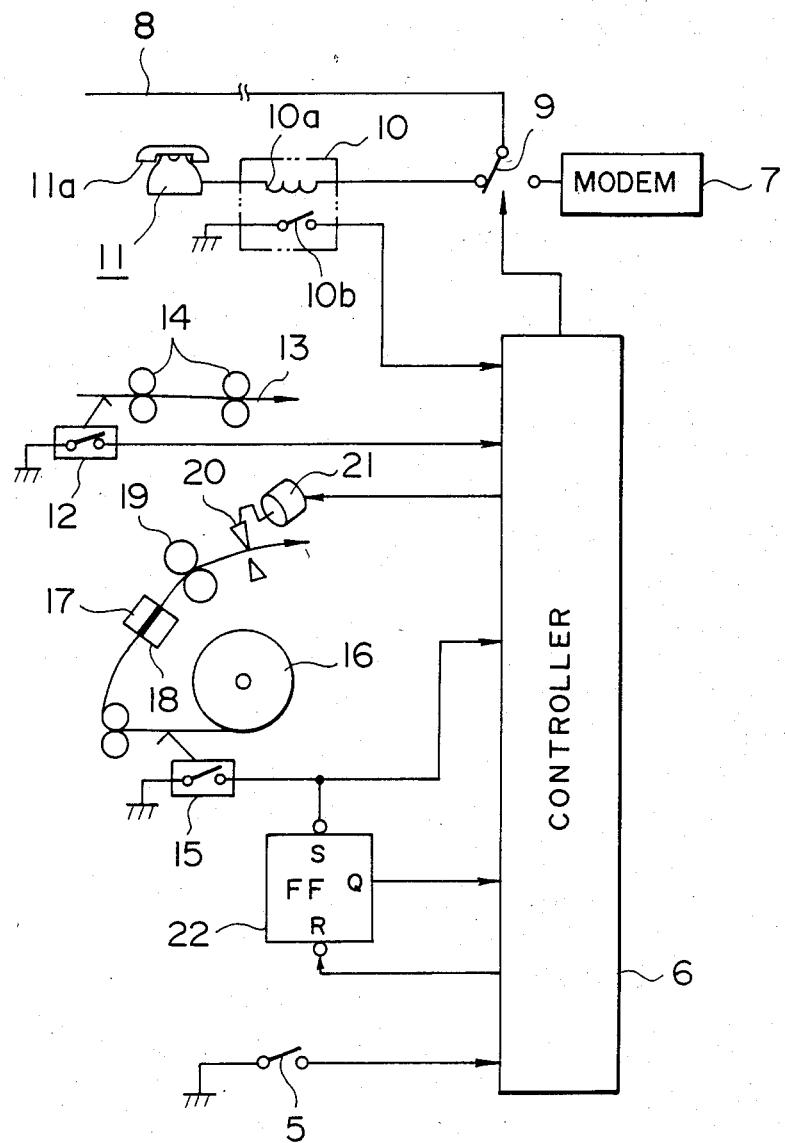
F I G. 4A

FACSIMILE APPARATUS

BACKGROUND OF THE INVENTION

1. Field of the Invention

The present invention relates to a facsimile apparatus which has simplified operation units to improve operability.

2. Description of the Prior Art

A facsimile apparatus transmits and receives an image between distant points by a tranceiver.

The facsimile apparatus can read and record an original document and can function as a copying machine.

The facsimile apparatus uses a rolled paper as a record paper so that it can record an original document of any length transmitted from a transmitting station, and the rolled paper is automatically cut depending on the length of the transmitted original document.

When the rolled paper is loaded in such a facsimile apparatus, it is necessary to cut a leading edge of the rolled paper.

The above operations are all carried out by control buttons arranged in the facsimile apparatus.

The control buttons in a prior art apparatus are shown in FIGS. 1 and 2.

FIG. 1 shows an arrangement of control buttons on a control panel. It includes a transmission button 1, a reception button 2, a copy button 3 and a rolled paper cutter button 4. These buttons are independent for each function.

These buttons are monitored by the facsimile apparatus as shown in FIG. 2.

In a step S1, the transmission button is monitored, in a step S2 the reception button is monitored, in a step S3 the copy button is monitored, and in a step S4 the cutter button is monitored. Depending on the button depressed, one of modes of the apparatus, a transmission mode F1, a reception mode F2, a copy mode F3 and a cut mode F4, is selected.

In such an apparatus, a plurality of buttons having independent functions must be provided and a large area is required for the control panel. Thus, the apparatus is complex, expensive and of large size.

Further, an operator has to select one of the four buttons and hence the operation is not simple.

SUMMARY OF THE INVENTION

It is an object of the present invention to provide an inexpensive and small size facsimile apparatus which has a reduced number of control switches and control buttons.

It is another object of the present invention to provide a facsimile apparatus having an improved operability which has a reduced number of control members without sacrificing content of control.

It is other object of the present invention to provide a facsimile apparatus which has a reduced number of control members to prevent misoperation of the control members.

It is a further object of the present invention to provide a facsimile apparatus which selects one of four modes of the facsimile apparatus, transmission, reception, copy and record paper cut modes, by actuation of one control member depending on states of a plurality of detection members.

BRIEF DESCRIPTION OF THE DRAWINGS

FIG. 1 is a plan view of prior art control buttons,

FIGS. 3 to 5 show an embodiment of the present invention, in which FIG. 3 is a plan view of a control button, FIG. 4A is a block diagram of a control circuit, FIG. 4B is a diagram of a controller and FIG. 5 is a flow chart for illustrating a control operation.

DETAILED DESCRIPTION OF THE PREFERRED EMBODIMENTS

First Embodiment

Figure 2:
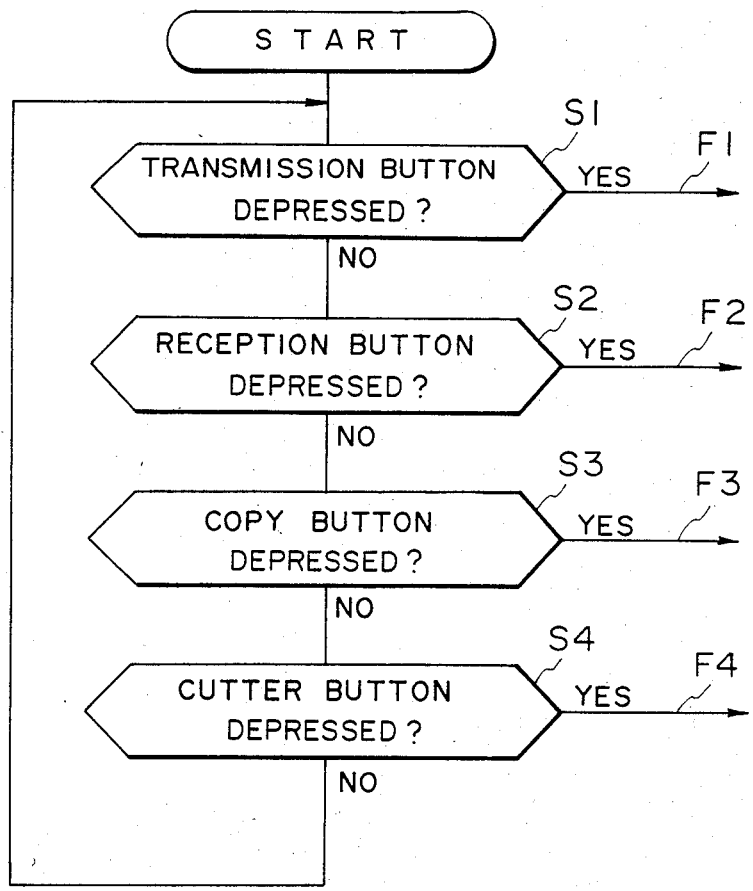
FIG. 2 is a flow chart for illustrating prior art control sequence.
Figure 4B:
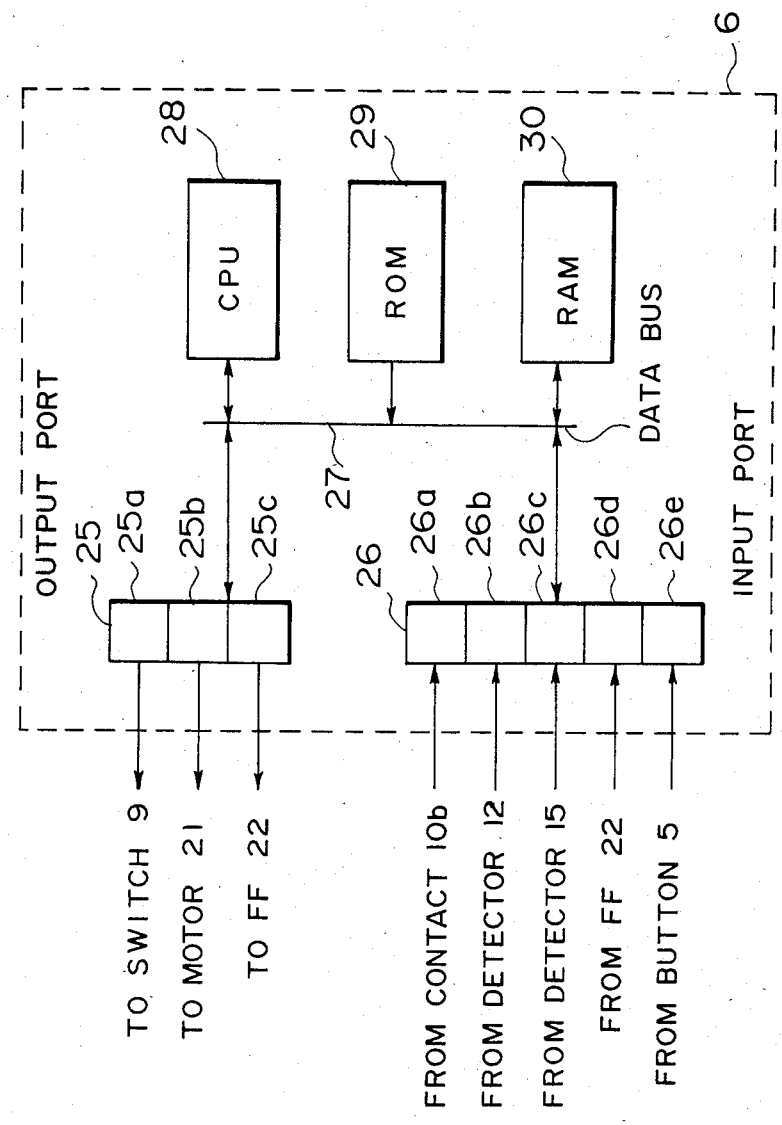
Figure 5:
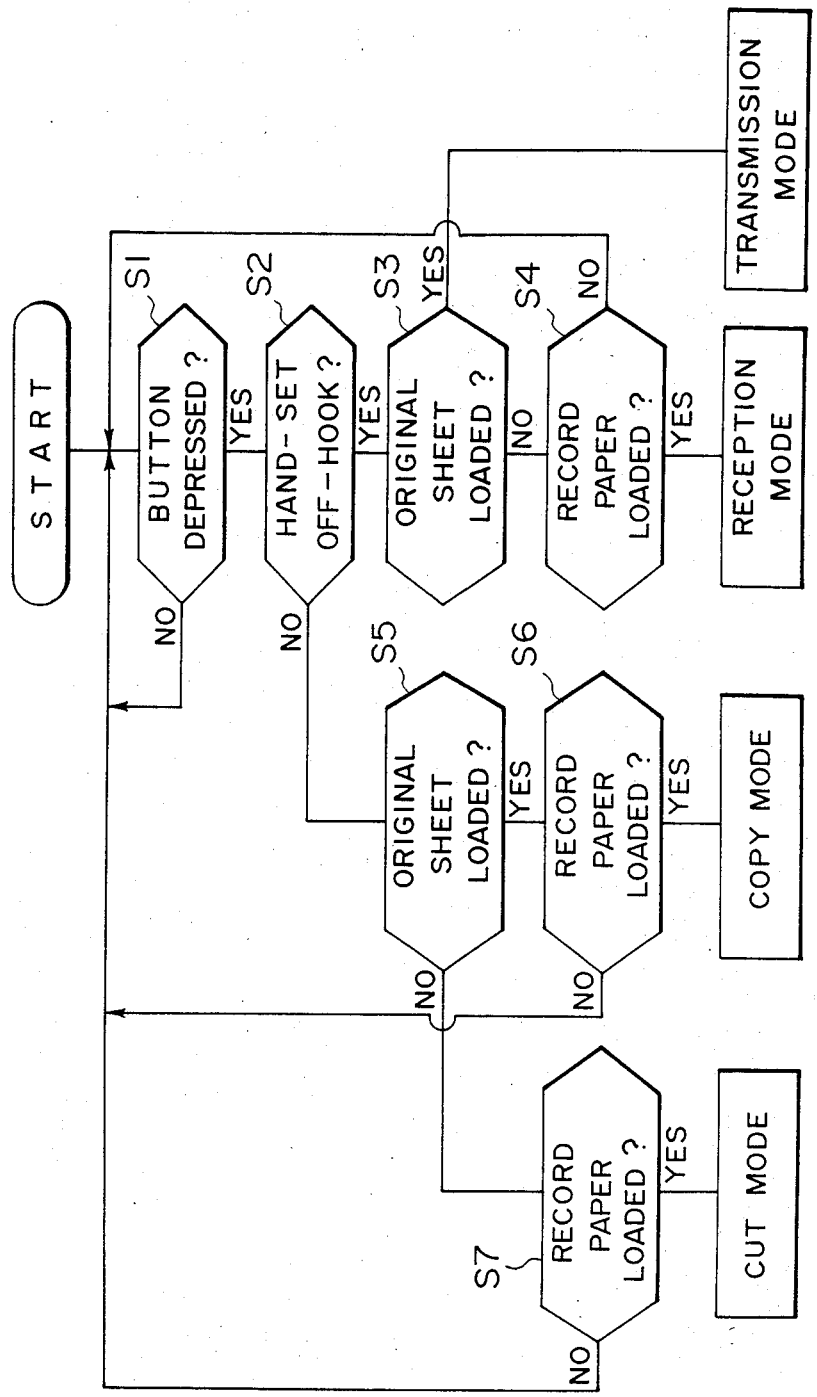

FIGS. 3 to 5 show a first embodiment of the present invention. As shown in FIG. 3, the present apparatus has only one control button 5.

FIG. 4A shows a block diagram of a control circuit of the present apparatus. Numeral 5 denotes the control button, numeral 6 denotes a controller, and numeral 8 denotes a telephone line which is connected to a telephone set 11 through a switch 9 and a relay 10. The relay 10 detects if a hand-set 11a is on-hook or not. When the hand-set 11a is off-hook, a circuit of the telephone set 11 is closed and a current is supplied from a switchboard, not shown, connected to the telephone line 8.

As a result, the current flows into a coil 10a of the relay 10 and a contact 10b is closed so that the off-hook state of the hand-set 11a is detected and a transmission or reception mode is detected.

Numeral 12 denotes an original sheet detector which mechanically or optically detects the presence or absence of the original sheet. Numeral 13 denotes the original sheet which is fed by feed rollers 14 in a direction of an arrow. Numeral 15 denotes a record paper detector which mechanically or optically detects a record paper. Numeral 16 denotes the record paper which is a rolled paper. The record paper 16 is guided along a platen 18, recorded by a recording head 17, fed by a feed roller 19 and cut by a cutter 20 when a received image has been recorded. The cutter 20 is driven by a plunger or motor 21.

Numeral 22 denotes a flip-flop which is set when the record paper detector 15 is closed to indicate the absence of the record paper, and reset by the controller 6.

The controller 6 detects the states of the relay 10, the original sheet detector 12, the record paper detector 15, the flip-flop 22 and the control button 5 to select one of the transmission, reception, copy and record paper cut modes. It usually comprises a microcomputer.

Numeral 7 denotes a modem which is connected to the telephone line 8 and the telephone set 11 through the relay switch 9 which selects the telephone set 11 or the modem 7.

FIG. 4B shows a detail of the controller 6 shown in FIG. 4A. Numeral 25 denotes an output port which includes portions 25a to 25c which are connected to the elements shown in FIG. 4A. Specifically, the portions 25a, 25b and 25c of the output port 25 are connected to the switch 9, the motor 21 and the flip-flop 22, respectively. Numeral 26 denotes an input port having portions 26a to 26e which are connected to the elements shown in FIG. 4A. Specifically, the portions 26a, 26b, 26c, 26d and 26e of the input port 26 are connected to the contact 10b, the original sheet detector 12, the record paper detector 15, the flip-flop 22 and the control button 5, respectively. The output port 25 and the input port 26 exchange signals with a CPU 28, a ROM 29 and a RAM 30 through a data bus 27.

The operation of the present embodiment is now explained with reference to a flow chart shown in FIG. 5.

When an original document is to be transmitted by the facsimile apparatus, the original sheet is loaded at a predetermined position in the apparatus.

Then, the hand-set 11a is hung on (that is the hand-set 11a is off-hook and the apparatus is in a transmission or reception mode) and the facsimile apparatus in the receiving station is called by dialing.

If the depression of the control button is determined in a step S1, the state of the hand-set is clecked in a step S2 and the presence or absence of the original sheet is checked in a step S3. If the presence of the original sheet is determined in the step S3, the controller 6 assumes the transmission mode.

If the absence of the original sheet is determined in the step S3, the presence or absence of the record paper is checked in a step S4. If the presence of the record paper is determined, the controller 6 assumes the reception mode.

If the hand-set is not hung on (that is, is on-hook) in the step S2, there is no need to call the receiving station, and the presence or absence of the original sheet is checked in a step S5. If it is present, the presence or absence of the record paper is checked in a step S6, and if it is present, the controller assumes the copy mode.

If the original sheet is not present in the step S5, the presence or absence of the record paper is checked in a step S7. If it is present, the controller assumes the record paper cut mode.

The above operations are summarized in Table 1, in which the on-hook state of the hand-set, the absence of the original sheet and the absence of the record paper are represented by "0", the off-hook (hung-on) state of the hand-set, the presence of the original sheet and the presence of the record paper are represented by "1", and "X" represents either "1" or "0".

TABLE 1

| Hand-set | Original Sheet | Record Paper | Operation |
| --- | --- | --- | --- |
| 0 | 0 | 0 | None |
| 0 | 0 | 1 | Cut |
| 0 | 1 | 1 | Copy |
| 1 | 0 | 1 | Reception |
| 1 | 1 | X | Transmission |

In the cut operation, the cutter 20 is activated when the control button 5 is depressed if the hand-set is not hung on, the original sheet 13 is absent and the record paper 16 is present. Thus, since the cutter 20 is activated whenever the control button 5 is depressed under this condition, the edge of the cutter is worn.

The cutting of the paper is required when the record paper roll has been exhausted and a new paper roll is loaded. Thus, if the device is constructed such that the paper is cut in response to the first depression of the control button 5 when the new paper roll is loaded, unnecesary cutter operation is prevented.

Thus, when the record paper 16 shown in FIG. 4A is exhausted the switch 15 is turned on to set the flip-flop 22. Then, the new record paper 16 is loaded and a leading edge of the record paper 16 is pulled out past the cutter 20. The portion of the paper pulled out of the cutter 20 is an unnecessary portion and it should be cut off. Only in such a case, is the cutter 20 activated in response to the depression of the control button 5. Such an arrangement is described in a second embodiment.

Second Embodiment

Figure 6:
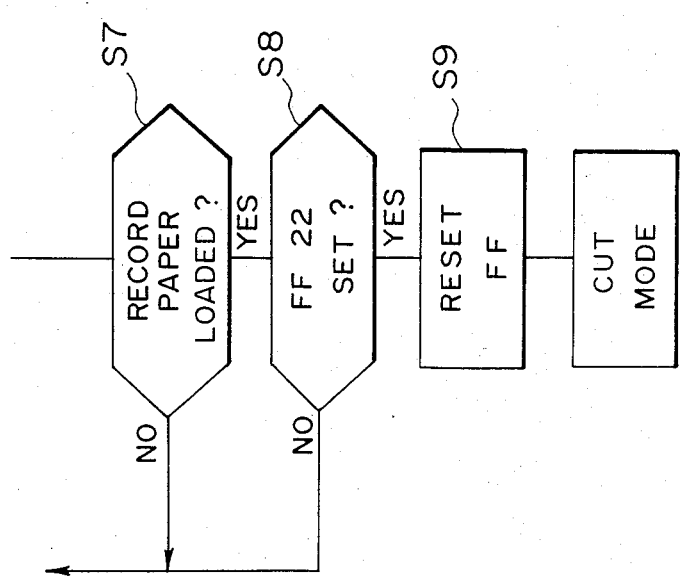
FIG. 6 is a flow chart for illustrating a control operation in another embodiment of the present invention.

FIG. 6 shows a second embodiment of the present invention. It shows steps following the step S6 of FIG. 5.

The controller 6 checks the presence or absence of the record paper in the step S7, and if it is present, it checks a set-reset state of the flip-flop 22 in a step S8. If it is set, the flip-flop 22 is reset to the initial state in a step S9 and the controller 6 assumes the record paper cut mode. Since the flip-flop 22 is not set until the record paper 16 is exhausted, the subsequent depression of the control button 5 is not effective to activate the cutter 20.

Since the loading of the record paper 16 is done with the power supply turned off, the flip-flop 22 may be set when the power supply is turned off and the control button is depressed. Such an arrangement is described in a third embodiment.

Third Embodiment

Figure 7:
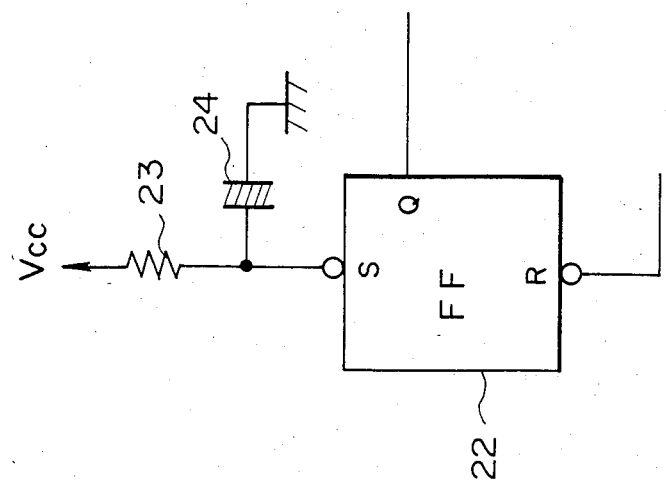
FIG. 7 is a block diagram of a further embodiment of the present invention.

FIG. 7 shows a third embodiment of the present invention. In the present embodiment, a resistor 23 and a capacitor 24 are connected between the flip-flop 22 and a power supply Vcc.

Since the facsimile apparatus automatically starts the reception operation in response to the call signal of the telephone, the power supply of the apparatus is continuously kept turned on. On the other hand, when the record paper 16 is cut, the power supply is usually turned off. Thus, when the power supply is turned off and then turned on, the flip-flop 22 is set with a delay determined by a time constant of the resistor 23 and the capacitor 24. If the control button 5 is depressed at this time, the record paper is cut, and the flip-flop 22 is not set subsequently until the power supply is turned off.

Accordingly, even if the control button 5 is depressed after the cut operation, the cut operation does not occur.

As described hereinabove, according to the present invention, since the transmission, reception, copy and record paper cut modes are automatically selected by the actuation of only one control button, the control panel is very simple and low in cost and the operability is improved.

What I claim is:

1. A facsimile apparatus comprising:
   a manual switch for instructing start of one of an original image transmission mode, an image reception mode and a recording paper cutting mode;
   communication detection means for detecting if said apparatus is available for communication;
   original sheet detection means for detecting if an original sheet is present at a predetermined position;
   a record paper detection means for detecting if a record paper is present at a predetermined position;
   cut control means for controlling cutting of the record paper; and
   means for selecting one of the three modes when said manual switch is operated, said selecting means selecting the recording paper cutting mode in the event (1) that said communication detection means detects that said apparatus is not available for communication, (2) said original sheet detection means does not detect an original sheet at its predetermined position, and (3) said record paper detection means detects that a record paper is at its predetermined position.

2. A facsimile apparatus according to claim 1, wherein said apparatus is operable with a telephone having a hand-set and wherein said communication detection means detects if said hand-set of said telephone is on-hook or off-hook.

3. A facsimile apparatus according to claim 1, wherein said selecting means selects the transmission mode in the event that (1) said communication detection means detects that said apparatus is available for communication and (2) said original sheet direction means detects an original sheet at its predetermined position.

4. A facsimile apparatus according to claim 1, wherein said selecting means selects the reception mode in the event that (1) said communication detection means detects that said apparatus is available for communication, (2) said original sheet detection means does not detect an original sheet at said predetermined position, and (3) said recording paper detection means detects a record paper at its predetermined position.

5. A facsimile apparatus according to claim 1, wherein said manual switch also instructs start of a copy mode for copying an original image and said selection means selects the copy mode in the event that (1) said communication detection means does not detect that said apparatus is available for communication, (2) said original sheet detection means detects an original sheet at its predetermined position, and (3) said record paper detection means detects a recording paper at its predetermined position.

* * * * *